Dec. 23, 1930.  R. P. BROWN  1,785,761
METER CONTROLLED RELAY MECHANISM
Filed Oct. 6, 1924
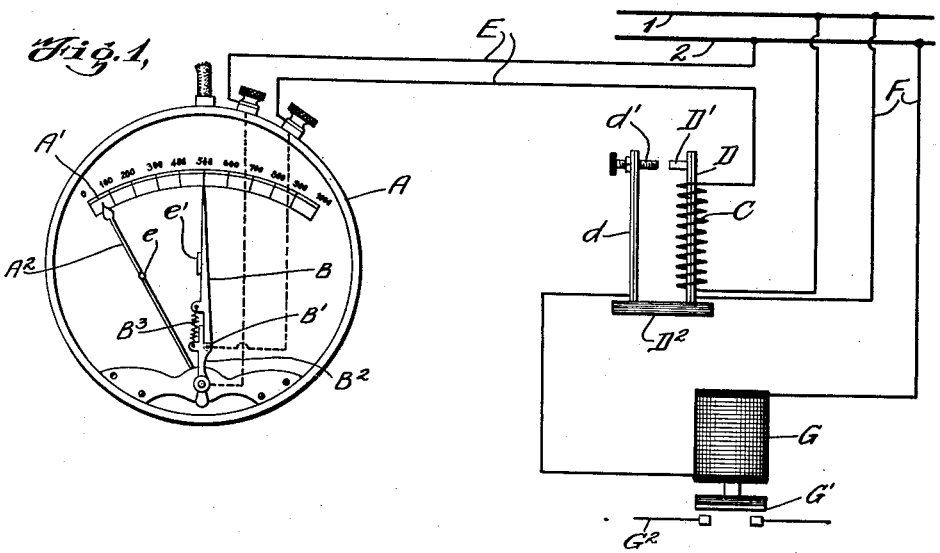
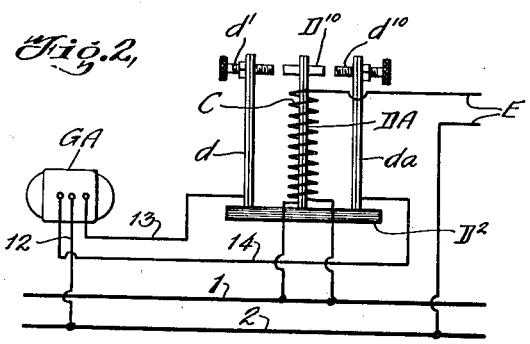
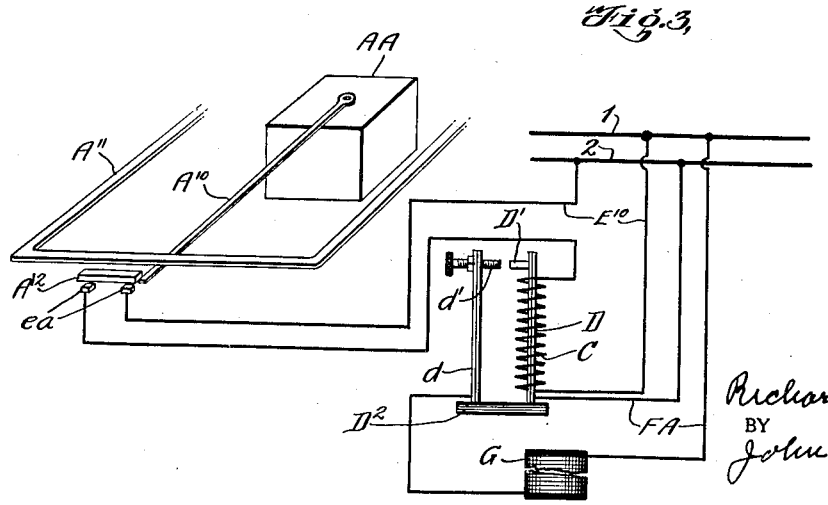
INVENTOR
Richard P Brown
BY
John E. Hubbell
ATTORNEY

Patented Dec. 23, 1930

1,785,761

UNITED STATES PATENT OFFICE

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA

METER-CONTROLLED RELAY MECHANISM

Application filed October 6, 1924. Serial No. 741,975.

The general object of my present invention is to provide an improved meter controlled relay mechanism. More specifically, the object of the invention is to provide a simple, reliable, and effective relay mechanism adapted for use with a sensitive control meter, such as a pressure gauge, a Bourdon tube thermometer, a milli-volt meter or the like.
With a sensitive meter there is a tendency, as the condition is approached under which the relay should be actuated, for the movable element of the meter to rapidly and repeatedly swing into and out of the relay actuating position. Moreover, with a sensitive meter, the movable element of the meter may occasionally swing momentarily into the relay actuating position when the condition which should result in the actuation of the relay does not exist at all, or only for a very brief time. The present invention was developed primarily for the purpose of successfully coping with the conditions to which reference has just been made, and to this end I have provided a relay mechanism with a suitable time constant, so that the relay will be actuated only in case the movable element of the meter is continuously maintained in a predetermined position for a certain predetermined time period, or as a result of the cumulative effects of a series of movements of the element into and out of said predetermined position in which the aggregate period of occupancy of the predetermined position is sufficiently large relative to the aggregate of the corresponding intervals in which the element is out of said position.

A specific object of the invention is to provide a satisfactory relay mechanism in which the relay proper is operated by a relatively small current flow in a circuit opened and closed by the movements of the movable element of a sensitive meter.

The invention may be embodied in various forms. In one preferred form of my invention the relay directly actuated by the meter is a thermostatic switch comprising a bi-metallic element and a heating coil for heating the bi-metallic element and thereby causing it to bend, the heating coil being energized when the movable element of the meter moves into a predetermined position. In such an instrument the temperature of the bi-metallic element of the thermostatic switch
is obviously jointly dependent upon the rate at which heat is supplied to the element by the heating coil and to the rate at which the element dissipates heat or tends to cool. In consequence, the bi-metallic element will not be operatively actuated by a momentary current flow through the heating coil resulting from the movement of the meter element into and then quickly out of the predetermined position, or by the aggregate current flow produced by a plurality of such movement occurring at relatively infrequent intervals. The bi-metallic element will be operatively actuated, however, when the movable element of the meter causes the heating coil to be continuously energized for a suitable period of time, and also when the movable element causes the heating coil to be energized at frequent intervals during a somewhat longer period of time in which the aggregate current flow through the heating coil is sufficient to heat the bi-metallic element to the temperature required for its effective actuation by a continuous current flow through the heating coil.

A thermostatic or other relay directly controlled by the meter in accordance with the present invention may be employed to directly control a furnace heating circuit, or to control a motor for operating switches or valves to control the heat of a furnace or for other purposes, or to adjust a recording pen and the amount of potentiometer resistance in circuit in a recording potentiometer, or for many other more or less analogous purposes.

The various features of novelty which characterize my invention are pointed out with particularity in the claims annexed to and forming a part of this specification; but for a better understanding of the invention, however, its advantages and specific objects attained with its use, reference should be had to the accompanying drawings and descriptive matter in which I have illustrated and described preferred embodiments of my invention.

Of the drawings:

Fig. 1 is a diagrammatic illustration of a control thermometer embodying the present invention;

Fig. 2 illustrates a modification of the apparatus shown in Fig. 1; and

Fig. 3 is a diagrammatic representation of the use of my invention in connection with a control meter comprising an intermittently actuated depressor.

In the form of the invention diagrammatically illustrated in Fig. 1, A represents a control meter which comprises a scale $A'$ and an index $A^2$ movable over the scale in response to changes in the value of a quantity measured by the meter. For example, the meter may be a thermometer of the type actuated by changes in pressure, resulting from changes in temperature, in a Bourdon tube. When the pointer $A^2$ swings into a predetermined position the contact $e$ carried by the pointer engages a stationary contact $e'$ to thereby close a relay circuit E and energize the controlled relay which then actuates a switch member $G'$ to open a previously closed circuit $G^2$. As shown the contact $e'$ is carried by an index member B pivotally connected at $B'$ to a support $B^2$. The latter may be angularly adjusted to move the free end of the arm B to different positions along the scale $A'$ and thereby correspondingly vary the position of the pointer $A^2$ at which the contact $e$ engages the contact $e'$. A spring $B^3$ normally holds the member arm B in fixed relation with the support $B^2$ but permits the arm B to swing in the clockwise direction about its pivotal support $B'$ when the contact $e$ engages the contact $e'$ with sufficient force to make this yielding desirable to avoid strain on the arm $A^2$. Insofar as above described, the apparatus shown in Fig. 1 does not differ from the control thermometer disclosed in the Wilhjelm Patent No. 1,489,911 of April 8, 1924.

The apparatus shown in Fig. 1 differs from that shown in the Wilhjelm patent, however, in the character of the relay mechanism employed and now to be described. This relay mechanism comprises a bi-metallic thermostatic element D anchored at one end to a support $D^2$, which advantageously is of insulating material. The free end of the element D carries a contact $D'$ which is moved toward and away from a co-operating contact $d'$, as the temperature of the element D increases and decreases. In some cases the contact $d'$ may be stationary, but advantageously it is carried by the free end of a bimetallic thermostatic element $d$ anchored to the support $D^2$, and similar to the element D so that similar changes in the temperatures of the elements D and $d$ produce similar movements of the contacts $D'$ and $d'$, and hence changes in atmospheric temperature do not change the positions of those contacts relative to one another. Advantageously, the contacts $D'$ and $d'$ are relatively adjustable and for this purpose the contact $d'$ is shown as comprising a threaded body screwed through a threaded opening in the element $d$.

The element D is surrounded by a heating coil C included in the circuit E, so that current flow through the coil C between supply conductors 1 and 2 will occur when contact $e$ engages contact $e'$, and will be interrupted when the movement of the pointer $A^2$ separates those contacts. The contacts $D'$ and $d'$ when in engagement with one another close a relay circuit F, and thereby create a current flow from the supply conductors 1 and 2 through a coil G connected in the circuit F in series with the contacts $D'$ and $d'$. In the apparatus shown in Fig. 1, the element G is the instrumentality directly controlled by the thermostatic relay switch, and might be a furnace heating coil, a rotating electric motor, or other device, but, as shown, is the winding of an electromagnetic switch the armature of which carries a switch member $G'$ shown as adapted to open and close the circuit $G^2$, which may be any power circuit which is desirable to open and close when the coil G is energized and de-energized.

The operation of the apparatus shown in Fig. 1 will be readily apparent to those skilled in the art without further explanation. The apparatus should obviously be proportioned and designed for the particular service for which it is intended. For example, the apparatus shown in Fig. 1 might well be arranged to cause an opening movement of the switch member G as a result of the continuous engagement of the contact $e$ with the contact $e'$ for a period of two seconds or for rapidly repeated engagements of the contact $e$ with, and separations of the latter from the contact $e'$, during a period of approximately five seconds in which the contacts E and $e$ are in engagement in all for two and a half seconds. It will be understood, of course, that the time periods just mentioned are given by way of illustration merely, and that the apparatus may be made to respond to very different contact periods. With the described arrangement the thermostatic element D may be made sufficiently positive and powerful in its action with a current flow through the heating coil C which is relatively very small. For example, and speaking again for purposes of illustration only, with a voltage between the supply conductors 1 and 2 of one hundred and ten volts, a current flow of two one hundredths of an ampere will give a sufficient heating effect for the successful operation of apparatus of the type illustrated in Fig. 1 in some cases. The current flow through the circuit E is, of course, much smaller than is required in the circuit F.

The smallness of the current flow set up and interrupted by the engagement of the contact $e$ with, and its separation from the contact $e'$ is highly advantageous as those skilled in the art will know. Any reduction in the strength of the current flowing in the circuit controlled by the contacts $e$ and $e'$ tends to minimize arcing between those contacts. The tendency to arcing may also be reduced, of course, by making the winding of the heating coil C non-inductive. As a result of the fact that the element D responds to the heating effect of the coil C, and not directly to the current flow through that coil, chatter in the engagement of the contacts $e$ and $e'$ does not result in a corresponding chattering engagement of the contacts $d'$ and $D'$, thus minimizing arcing between contacts $d'$ and $D'$ and an objectional intermittent actuation of the coil F or other device controlled by the contacts $d'$ and $D'$. The fact that the present invention makes chatter of the contacts $e$ and $e'$ practically innocuous is especially important because such chatter is practically inevitable in many cases due to the required sensitiveness of the control meters which cannot be made sufficiently dead beat to avoid such chatter and still be sufficiently sensitive. Such meters are so sensitive that chatter may even result in some cases from mechanical vibration to which the instrument is subjected.

In Fig. 2 I have illustrated a modification of the apparatus shown in Fig. 1 in which the relay actuated device GA, replacing the device G of Fig. 1, is a reversible electric motor which may be used to control switches or valves or for other purposes for which a relay motor is desirably employed. In Fig. 2 the relay also comprises a bi-metallic thermostatic element $da$ similar to the element $d$ and mounted at the opposite side of the main element DA which in this arrangement carries at its free end a contact $D^{10}$. The latter engages the contact $d'$ when the element DA flexes in one direction as on a predetermined increase in its temperature relative to the temperature of the elements $d$ and $da$, while on a predetermined decrease in such relative temperatures, the element DA bends in the opposite direction and the contact $D^{10}$ engages the contact $d^{10}$ carried by the element $da$. The motor GA has a common terminal connected to the supply conductor 2, a second terminal connected to the element $d$, and a third terminal connected to the element $da$. The element DA is connected to the supply conductor 1. In consequence, when the element DA flexes in one direction and the contact $D^{10}$ engages the contact $d'$, one winding of the motor GA is energized and the latter turns in one direction; conversely when the element DA flexs in the opposite direction and the contact $D^{10}$ engages the contact $d^{10}$, a second circuit of the motor GA is energized and the latter rotates in the reverse direction.

In Fig. 3 I have illustrated a meter AA of known type as shown, for example, in Patent No. 1,229,427 of April 8, 1919, in which a depressor $A^{11}$ is periodically actuated to depress the meter pointer $A^{10}$, and thereby cause a switch member $A^{12}$ to be depressed and connect normally disconnected contacts $ea$ when the pointer $A^{10}$ is above the switch member $A^{12}$ at the instant it is depressed, but if the pointer $A^{10}$ is at the side of the member $A^{12}$ when the depressor $A^{11}$ is actuated, the depression of the pointer $A^{10}$ does not change the normally disconnected condition of the contacts $ea$. The contacts $ea$ form part of a circuit $E^{10}$ closed when the member $A^{12}$ is depressed, and shown as then supplying current to the heating coil C of a thermostatic relay similar to that shown in Fig. 1 and similarly controlling a device G.

The use of a simple bi-metallic thermostatic element as a switch actuator responsive to the heating effect of the current flow through a heating coil surrounding said element and included in an energizing circuit directly controlled by the meter which opens and closes said circuit whenever the movable element of the meter moves respectively into and out of a predetermined position, permits of an exceedingly simple, reliable and effective construction. The relatively small thermal capacity of the simple bi-metallic thermostatic element enables it to be heated and actuated by a current flow through the heating coil, which is relatively very small. The smallness of the current required minimizes sparking difficulties at the meter controlled contacts and permits those to be opened and closed by a relatively sensitive meter element. The relative smallness of the heating current, and the character of the construction also makes it possible to maintain the current flow through the heating coil for as long a period as may be required after the relay mechanism is set in operation until, as a result of the corrective effect of such operation, the meter again opens the heating coil energizing circuit. The small thermal capacity of the bi-metallic thermostatic relay switch actuator and its heat-coil avoids any time lag in the operation of the relay switch mechanism itself. In consequence, while, as already explained, the closure of the thermostatic relay switch involves a time constant which eliminates difficulties otherwise experienced from chattering of the meter controlled switch contacts, the relay switch opens almost immediately after the contacts directly controlled by the meter open.

While in accordance with the provisions of the statutes, I have illustrated and described the best forms of my invention now known to me, it will be apparent to those skilled in the art that changes in form may be made without departing from the spirit of my invention as set forth in the appended claims, and that some features of my invention may sometimes be used to advantage without a corresponding use of other features.

Having now described my invention, what I claim as new and desire to secure by Letters Patent, is:

1. The combination with a sensitive control meter including a deflecting member adapted to make rapid oscillations in response to variations in the quantity metered, of a relay comprising an electric heater and a bimetallic thermostatic actuating element energized by said heater, and means including a contact engaged by said member in one position of the latter for energizing said heater when said member is in said position.

2. The combination with a sensitive control member including a deflecting member adapted to make rapid oscillations in response to variations in the quantity metered, of a relay comprising an electric heater and a bimetallic thermostatic actuating element energized by said heater, and means including a contact located at one side of a normal range of movement of said member, and circuit connections associated with said member and contact for energizing said heater when said member engages said contact.

Signed at Philadelphia, in the county of Philadelphia, and State of Pennsylvania, this 2nd day of October, A. D. 1924.

RICHARD P. BROWN.